May 23, 1939. R. S. MILLER ET AL 2,159,396
CONVEYER CHAIN
Filed March 26, 1938
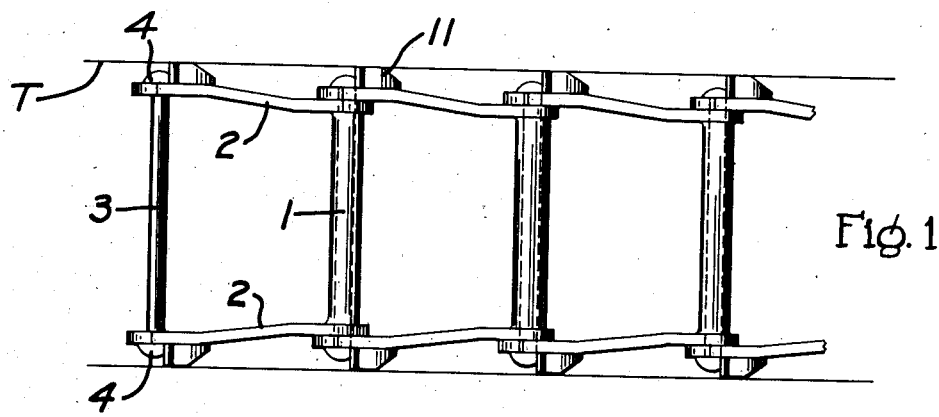
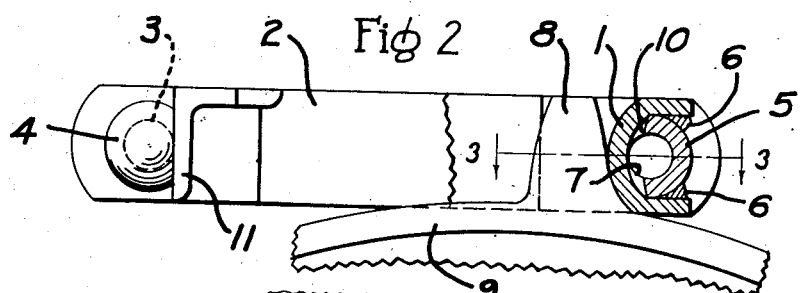
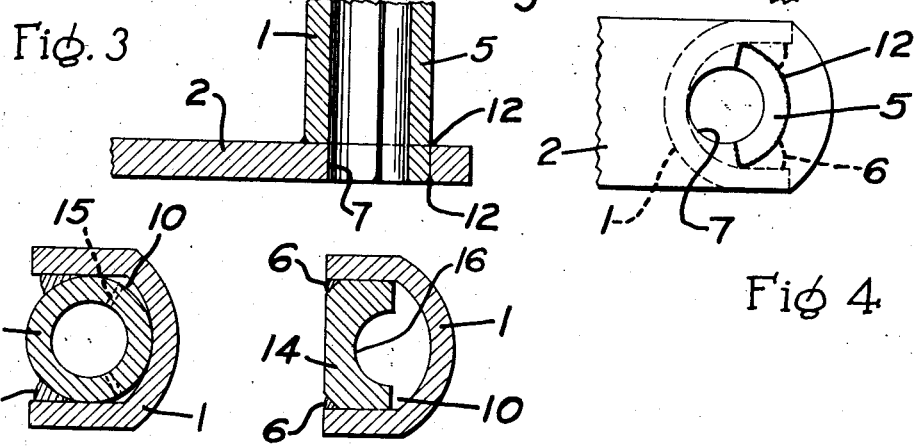
Fig 5  Fig 6
Robert S. Miller
Hans Hansen    Inventors
By
Charles L. Reynolds
Attorney

Patented May 23, 1939

2,159,396

UNITED STATES PATENT OFFICE 2,159,396

CONVEYER CHAIN

Robert S. Miller and Hans Hansen, Portland, Oreg., assignors, by mesne assignments, to W. A. Deming, Bellingham, Wash.

Application March 26, 1938, Serial No. 198,235

9 Claims. (Cl. 198—168)

Our invention relates to chains, and is particularly designed for chains which are called "drag chains", which by moving through a trough or over a table advance materials from point to point. Such chains are used in sawmills, for instance, to dispose of refuse, or to convey materials from place to place.

Such chains are sometimes subjected to severe usage, and must be made sufficiently strong to withstand either impact or the application of a considerable force to advance the objects in contact with them, and which may subject the chain to severe stresses. It is a primary object of the invention, then, to devise a chain the links whereof are sufficiently strong and rugged, and made in such a way and of such materials, that they will not be subject to breakage, on the one hand, and are so formed and reinforced that they will withstand stresses considerably greater than those which can be normally withstood by chains for like purposes as heretofore made.

A further object is to provide a construction of such a chain and the links thereof which will minimize the difficulties due to lack of adquate lubrication, and which, on the contrary, will be so constructed as to provide a lubricant reservoir adequate for an appreciable period of time.

Associated with the latter object it is also an object to provide a construction such that the through pin which holds the links together will be held against rotation by one link and permitted to rotate only with respect to the other link, the connection with the second link being such as to apply lubricant to the surfaces between this latter link and the pin.

It is a further object to provide such a chain, the links whereof may be made lighter as well as stronger, and to each such end is constructed of wrought iron or steel, and the parts whereof are assembled by welding.

The principles of our invention are susceptible of embodiment in various typical forms, and our invention, therefore, comprises the novel chain and links therefor, as shown in the accompanying drawing, described in this specification, and limited only as defined by the claims which terminate the specification.

In the accompanying drawing our invention is shown in several typical embodiments, as at present preferred by us.

Figure 1 is a plan view of several links of such a chain assembled.

Figure 2 is in part a side elevation and in part a section through one such link, shown in conjunction with the drive sprocket of a drive wheel.

Figure 3 is a detail section on the line 3—3 of Figure 2, and Figure 4 is an end elevation, of the construction now preferred by us, showing a detail of the assembly of the elements.

Figures 5 and 6 are detail sections, showing modified forms of construction.

Such chain is frequently employed to drag through the bottom of a trough, indicated at T. It is composed of a plurality of U-shaped links secured together by through pins sometimes, in the trade, called rivets. Each such link is formed of two spaced side bars 2, and a cross bar connecting one end of the two side bars, which cross bar is usually of such form as to define a through passage in which to receive the through pin 3. The side bars have their ends offset, as shown in Figure 1, whereby they span the closed end of an adjoining link. Holes are provided in the side bars at the open end of the links to receive the ends of the pin 3, and these projecting ends are then upset to form heads 4.

The side bars 2 and the elements constituting the cross bar in our construction are preferably formed of fabricated steel, such as steel plates, for greater strength and lightness, and to enable the parts to be assembled by welding, whereas links as heretofore made were made of one piece of malleable iron. The cross bars of such chains are engaged by the drive sprockets, and are frequently subjected to very considerable stresses, whereby they tend to be bent. With the chain made of malleable iron such bending, when it occurred, caused binding on the pin, and thereby improper functioning of the chain, and caused breakage in some instances, and breakage in such chains is serious because of the stoppage thereby entailed, and the consequent loss of time in other parts of the mill of which such chains are a part. While the cross bars of malleable links might be made heavier and stronger, this increased their weight and still did not prevent the damage referred to, in many instances. Accordingly we have provided means whereby the cross bar of such links may be made extremely strong and rugged, and braced or trussed in a beam-like construction, to avoid the possibility of bending or breaking under any stresses to which they may be subjected in normal use.

In former chains, because no provision was made for positively preventing rotation of the pin's head, at least at one end, the torque on the pin at this free end, during use of the chain, and because of the binding effect of the through passage wherein the pin was received, was very great. By securing each end of the pin against rotation relatively to one link, this torque is very greatly reduced, and instead of relieving the bearing on the pin, in the through passage, to reduce the torque, in our invention the pin may bear throughout its entire length, yet with less torque than occurred in the relieved bearing, and with consequent increase in strength and resistance to bending.

According to our invention the cross bar is formed of two parts. A channel-shaped member 1 is formed of a steel plate bent into channel shape, of a length to connect the two spaced side bars 2, and this channel 1 is reinforced by a channel 5, likewise preferably formed of a steel plate bent into approximately semi-circular form, which is disposed within the legs of the channel 1, extending from one side bar to the other, and which preferably faces in the direction opposite to that in which the channel 1 faces. Each mutually increases the natural strength and rigidity of the other, arising from their channel form, and from the material of which they are made. These two plates may be welded together, as indicated at 6, and each of them may be welded to the side bars 2 between which they extend. The two plates thus connected to each other and to the side bars form a through passage to receive the pin 3, and this through passage, therefore, registers with the holes 7 in the side bars, which receive the pin 3.

Preferably the holes 7 are circular (with an exception hereafter noted), and the curvature of the channel 1 is greater in radius than the radius of the holes 7, but is so placed that the hole 7 is tangent to the concave side of the channel 1 at the bottom of the latter, and the channel 1 has its open side faced away from the driving face of the sprocket 8, carried by the drive wheel 9, although the facing of the channel 1 as described is not strictly essential. Preferably, too, the radius of curvature of the inner channel 5 is identical with the radius of the hole 7, so that the channel 5 closely surrounds the pin 3. The ends of the channel 5, prior to its bending, need not be scarfed, but may be left approximately normal to the upper and lower surfaces of the plates, so that when it is bent about a short radius these ends assume a somewhat sloping form, but still when the channel 5 is placed within the legs of the channel 1 there is left a space 10 which constitutes a grease reservoir for the pin.

Since the pin is to rotate with respect to the channels 1 and 5 constituting the cross bar, it should be held against rotation with respect to the open ends of the adjoining U-shaped link, and to that end, and also for the purpose of clearing the trough of material lying adjacent its edges, each link is provided with outstanding spurs 11, consisting of short lengths of angle iron welded to the outer faces of the side bars, adjacent to the holes, in such end, which receive the projecting ends of the pin. The pin, after insertion, has its two ends upset to form heads 4, as previously described, and by thus upsetting the heads, with the spurs 11 closely adjacent the hole through which the pin projects, each head is formed flattened on one side, as seen in Figure 2, this flattened side pressing closely against a flat face of the spur 11, and each head of the pin, at its opposite ends, is thereby prevented from rotating relative to the link whereon such spurs are carried. As a result the torque on the pin, tending to twist it, is very materially reduced and far better resisted than in previous constructions because of the fact that the pin is held against rotation, not only at one end, but at both ends. This being so, the pin may bear against the channels 1 and 5 throughout its length, without developing undue stress in the pin; the provision for lubrication also assists in lessening the stress on the pin.

The channel 1, being of a height approximately equal to the height of the side bars 2, preferably extends only between the inner faces of the side bars, where it is welded to the latter. If a weld were faulty, this might constitute a point of possible failure. The channel 5, however, is of less height than the height of the side bars, and preferably the holes in the side bars are enlarged or cut away to permit the ends of the channels 5 to project into or through the side bars (see Figures 3 and 4), to be closely received in such enlargements. This very materially increases the strength of the channel 5 and the support it may give to the channel 1, for the channel 5 cannot be displaced without tearing out the ends of the side bars. Its ends are welded to the side bars preferably at each side of the latter, as is shown in the figures referred to, and as indicated at 12.

The opposite positioning of two approximately semi-circular channels 1 and 5 produces a valley, extending the length of the channels and at each side thereof, which may be filled with the welding 6 throughout the length of the cross bar, and thus the two channels are held immovably with respect to each other and are strengthened by the weld, in such a way that they form in effect a truss construction, which is extremely strong. The convex face of the channel 1, however its open end may be faced, is so shaped as to afford proper driving contact for the driving face of the sprocket 8.

The same principles of construction may be embodied in somewhat different forms. Thus in Figure 5 the channel 5 is replaced with a tube or pipe-like form 13, which may be provided with holes 15 to admit lubricant to the grease chamber 10. Thus reliance is not placed wholly on the tubular form of the element 13, but this is reinforced by the channel-like form 1 welded at 6 to the tubular form 13. Also in Figure 6 the inner channel 14 is of generally rectangular form, interrupted by a half channel 16, and completely fills the space between the legs of the channel 1 except as a valley or groove is provided for the welds at 6.

Such a chain fills a long-felt need by operators of flat chain conveyers, affording them a conveyer which is long wearing, which has the strength of steel, and with the added strength of the structural or truss effect in the cross bar, yet without appreciable added weight, and in fact of a weight less than the weight of malleable chains of comparable strength. The channel 1, having its open side facing in the direction of advance, and being filled by the channel 5 and by the welding 6, has adequate vertical extent to engage material in the trough T, and to move such material as the chain advances. The provision of a lubricant reservoir permits such chains to run for considerable periods without attention.

What we claim as our invention is:

1. A drag chain formed of a plurality of U-shaped links each having two spaced side bars each apertured at both ends, and a connecting cross bar constituting a barrel, said barrel comprising a channel shaped element connecting and secured at its ends to the opposite side bars, and having a convex surface facing towards a drive sprocket, a stiffener element extending between the side bars, disposed within and closing the open side of the channel, and secured to the latter to reinforce it, the through passage thus defined registering with apertures at one end of the side bars, and a pin received in such passage and apertures, and in registering apertures in the open end of an adjoining link, to connect the two together.

2. A drag chain formed of a plurality of U-shaped links each having two spaced side bars each apertured at both ends, a metal plate bent into channel shape connecting and secured at its ends to the opposite side bars, with its open side facing away from the driving face of a drive sprocket, and substantially tangent to the apertures at the ends of the side bars, a metal stiffener element extending between the side bars, closing the open side of the channel and welded to the latter, and a pin received in the through passage thus defined, and in the registering apertures, and also in the registering apertures in the open end of an adjoining link, to connect the two together.

3. A drag chain formed of a plurality of U-shaped links each having spaced side bars having a circular hole at each end, a channel having an inner radius of curvature greater than the radius of the holes, and disposed between and secured to the side bars, with the holes at one end of the link tangent to the bottom of the channel, and with its open side facing away from the driving face of a drive sprocket, a pin passing through such holes in the side bars and contacting the channel substantially throughout its length, and passing through registering holes in the open end of an adjoining link, and a stiffener element disposed between and secured to the side bars and the sides of the channel, but not completely filling the channel, whereby to leave space for a lubricant reservoir between the channel and stiffener.

4. A drag chain formed of a plurality of U-shaped links each having spaced side bars having a circular hole at each end, a channel having an inner radius of curvature greater than the radius of the holes, and disposed between and secured to the side bars, with the holes at one end of the link tangent to the bottom of the channel, and with its open side facing away from the driving face of a drive sprocket, a pin passing through such holes in the side bars and contacting the channel substantially throughout its length, and passing through registering holes in the open end of an adjoining link, and a stiffener element of general U-shape disposed between the sides of the channel, facing oppositely thereto, and secured thereto along its length.

5. A drag chain formed of a plurality of U-shaped links each having spaced side bars having a circular hole at each end, a channel having an inner radius of curvature greater than the radius of the holes, and disposed between and secured to the side bars, with the holes at one end of the link tangent to the bottom of the channel, and with its open side facing away from the driving face of a drive sprocket, a pin passing through such holes in the side bars and contacting the channel substantially throughout its length, and passing through registering holes in the open end of an adjoining link, and a stiffener element of general U-shape disposed between the sides of the channel, facing oppositely thereto, and secured thereto along its length, the ends of said stiffener extending through the side bars, the holes therein being formed to closely receive such ends, and these ends being secured to the side bars.

6. A drag chain formed of a plurality of U-shaped links each having spaced side bars having a hole at each end, a plate bent into channel form disposed between and welded to the side bars, to enclose the holes, and with its open side facing away from the driving face of a drive sprocket, a second plate bent into channel form, facing oppositely to the first channel, disposed between the legs thereof, to define between said channels a non-circular through passage, constituting in part a lubricant reservoir, the ends of the second channel entering the holes, and the second channel being welded to the side bars and to the first channel to stiffen the latter, and a pin of circular cross section rotatively received in the through passage, the holes in the side bars, in cooperation with the ends of the second channel, defining circular holes closely embracing the pin, the pin also passing through holes in the open end of an adjoining link, to secure the two together.

7. A drag chain formed of a plurality of U-shaped links each having spaced side bars having a hole at each end, a plate bent into channel form disposed between and welded to the side bars, to enclose the holes, and with its open side facing away from the driving face of a drive sprocket, a second plate bent into channel form, facing oppositely to the first channel, disposed between the legs thereof, to define between said channels a non-circular through passage, constituting in part a lubricant reservoir, the ends of the second channel entering the holes, and the second channel being welded to the side bars and to the first channel to stiffen the latter, a pin of circular cross section rotatively received in the through passage, the holes in the side bars, in cooperation with the ends of the second channel, defining circular holes closely embracing the pin, the pin also passing through holes in the open end of an adjoining link, to secure the two together, and means to hold the pin against rotation relative to the second link, whereby rotation occurs solely between the pin and the elements which define the through passage.

8. A drag chain for use within a trough, formed of a plurality of U-shaped links each having spaced side bars and a hollow cross bar defining a through passage, a pin rotatively received within the through passage and in holes provided in the open end of an adjoining link, to link the two together, upset heads formed on the ends of the pin, externally of the second link, and a spur formed to fit the angle at each side of the trough, and fixed on such second link, interrupting the shape of the pin's head, at each end, to form a flattened face thereon, whereby to prevent rotation of the pin relative to the second link.

9. A drag chain formed of a plurality of U-shaped links each having spaced side bars each of which is apertured at both ends, and a barrel comprising a channel shaped element connecting and secured at its ends to the opposite side bars, and a second channel shaped element between the side bars, the concave side whereof faces the concave side of the first such element, and which is secured therealong, to strengthen the barrel and to define a through passage registering with the apertures at one end of the link, and a pin extending through such passage and apertures, and through the apertures in the open end of the adjoining link, to secure the two links together.

ROBERT S. MILLER.
HANS HANSEN.